United States Patent Office 3,013,909
Patented Dec. 19, 1961

3,013,909
METHOD OF CHEMICAL DECONTAMINATION OF STAINLESS STEEL NUCLEAR FACILITIES
Guyon P. Pancer and John L. Zegger, Schenectady, N.Y., assignors to the United States of America as represented by the United States Atomic Energy Commission
No Drawing. Filed Mar. 31, 1960, Ser. No. 19,131
10 Claims. (Cl. 134—3)

This invention relates to a method of decontaminating nuclear facilities and more particularly to a method of chemically decontaminating primary nuclear elements in pressurized water or like systems to facilitate maintenance and emergency repair.

In the operation of a nuclear facility such as a nuclear reactor power plant utilizing a pressurized water reactor, the build-up of activated corrosion products on the primary system surfaces of the primary elements of the system may present a serious restriction to the normal operation of the installation. Continued build-up of this activity restricts accessibility and inhibits necessary maintenance operations. Regular maintenance is of particular importance in a small power plant where staffs are small and excessive dose rates could seriously restrict operation. For example, if the steam generator in a pressurized water reactor power plant is found to be defective in some way or requires its isolation from the system so that a maintenance or repair operation can be conducted, it is necessary to provide first for the decontamination of the generator before it can be handled conveniently to effect its repair and return into the system.

In a reactor power plant of the pressurized water reactor type the corrosion product deposits are composed chiefly of magnetite ($Fe_3O_4$) with small amounts of nickel and chromium oxides. The radio-chemical composition depends upon the material of construction, and for example, in one type of reactor, $Fe^{59}$, $Co^{60,58}$, $Mn^{54}$ and $Cr^{51}$ have been identified in the corrosion product scale found in the primary system elements. While the extent of contamination by activated corrosion products is influenced by many factors, including water chemistry, time, temperature, pressure, and pre-corrosion treatment in the type of metal involved it has been found that ordinarily a radioactive film is formed which is difficult to remove even by action of strong chemical agents. Considerable effort has been devoted to the removal of such corrosion products from metal surfaces, and the techniques which have been employed include chemical removal, ultrasonics, and electrolytic descaling. However, most of the techniques involved in these efforts have been concerned with the decontamination of large facilities or inaccessible components by the use of involved chemical methods. For example, reducing complexing solutions have been developed to remove activated corrosion products in certain nuclear facilities, and a process has been used to decontaminate a loop at the Hanford Atomic Power operation. Generally, these and other processes for the chemical decontamination of nuclear facilities have heretofore achieved only partial success, although chemical decontamination seems to represent the most practical way of decontaminating both a large and small facility.

This invention involves an improvement in the chemical decontamination approach and involves basically a caustic permanganate treatment followed by an acid rinse in which there is an optimum combination of time, temperature, concentration and other conditions to obtain the desired result, as well as certain limitations. In particular, the preferred method involves the so-called fill-flush procedure by which is meant filling the system to be decontaminated with the required solution, circulating the latter and then flushing. Using this method, two separate solutions are filled and flushed in this manner and these fillings are separated by wash-downs with demineralized water to remove all traces of the chemical solutions being used.

It is thus a first object of this invention to provide a method of decontaminating the radioactive surfaces in a nuclear facility.

It is a further object to provide a method for the removal of radioactive films.

It is still a further object of this invention to provide for the removal of radioactive products from the primary surfaces in the system of a pressurized water reactor.

Other objects and advantages of this invention will become more apparent from the following description of a preferred embodiment of the invention.

For convenience of evaluating the effect of the various variables involved in radioactive decontamination, a single measurement is utilized as a figure of merit. This is the decontamination factor (DF). By definition, DF equals net initial activity divided by net final activity. Thus a DF of 100 refers to 99% activity removed while a DF of 5 refers to 80% activity removed. It is understood, of course, that a DF of either 5 or 100 may both indicate satisfactory decontamination depending upon the initial activity. In passing it is noted that one limitation of a hypothetical DF is that since the purpose of decontamination is to permit maintenance of a nuclear facility, the final activity measured is as important as the DF itself.

Metals to which this invention is found to be particularly applicable and which are useful in the construction of primary system elements in a nuclear facility are, for example, Type 304 stainless steel annealed and sensitized, a Stainless Steel Croloy 16–1 which is a modified type 430 stainless steel, and a low carbon steel. Samples of the above materials were contaminated for the purposes of developing the necessary criteria of this invention by their insertion in the purification system of an existing pressurized water reactor so that they were exposed to the conditions for representative periods of time found in the primary elements of such a reactor system.

It was found that a caustic permanganate primary solution followed by a rinse (secondary) solution, an ammonium citrate solution, was most effective in removing the activated corrosion product scales from the stainless steels.

The caustic permanganate solution consisted of sodium hydroxide and potassium permanganate and gave satisfactory decontamination results when followed by the rinse solution. Radiochemical analysis indicated that approximately 75% of the manganese-54 activity was removed by the caustic solution. It also appears that the major part of the chromium-51 and iron-59 activity was removed by this solution. Cobalt-60 and cobalt-58 activities were removed by the rinse solution.

The secondary solution of ammonium citrate and citric acid gave satisfactory decontamination in the second stage. A complexing agent known as Versene in small amounts was added to enhance the complexing power of the solution. Versene is a trade name for products of the Dow Chemical Company and is associated with tri and tetra salts of ethylene - diamine - tetra - acetic acid (EDTA). Where Versene is referred to herein it refers to either the Versene acid, Versene powder, or Versene Fe–3 Powder. The Versene is a chelating agent which, when used in conjunction with the acidic rinse as hereinafter described, increases substantially the overall effectiveness of the whole process. It was also found that the decontamination was increased when the contaminated metal surface was allowed to dry prior to the addition of the citric acid rinse. A decontamination treatment with citric acid as a secondary rinse solution resulted in higher corrosion rates on the sensitized stainless steel, but presence of the ammonium citrate in accordance with this invention resulted in less corrosion on the sensitized stainless steel. It was also found that flow rate dependency was reduced as a result of the presence of the citric acid, thus indicating a highly desirable combination of ingredients making up the secondary rinse.

Regarding the corrosive effects of the solutions utilized in this invention, typical corrosion results (in mils penetration) for the caustic permanganate-citrate combination solution treatment described above, based on a 30 hour exposure time, are for Inconel (0.002), annealed Type 304 stainless steel (0.008), sensitized Type 304 stainless steel (0.017), Croloy 16-1 (0.029) and AISI C1010 Carbon Steel (1.82), which are permissible values. Also, there was no evidence of any cracking or any significant amount of intergranular corrosion or localized attack on any of the metal specimens. Evidence of possible crevice corrosion was found in the root area of weld specimens subjected to long term static caustic permanganate solution at 77° F. and 122° F. for eight weeks. There was no evidence of crevice corrosion on weld samples exposed in the same solution at 203° F. for four weeks.

It was found, also, that activity buildup and weight loss on the metal samples re-exposed in the primary purification system following decontamination by the inventive method were found to be less than new metal samples, and this is believed to be a significant further advantage of this invention.

All of the ingredients used in the tests were of reagent grade purity. The pH of the primary solution was approximately 12.8.

In the tests using caustic permanganate solutions it was found that the temperature of the solutions could be maintained between 185° F. and 225° F. to give satisfactory decontamination results. However, the caustic permanganate solution was found to be most effective when at the higher temperature of 225° F., slightly above its boiling point, with sufficient pressure used to prevent boiling.

In general the higher the operating temperature for the various solutions the more effective were these solutions in the decontamination of the samples. However, the higher temperatures also tended to result in excessive corrosion of the base metal so the temperature of 225° F. is found to be both the most desirable and effective for the purposes of this invention, and at the same time an upper limit.

Regarding flow conditions during the filling and flushing of the equipment it was observed that an increase in flow rate tended to increase the removable activity. With the ammonium citrate solution a high flow rate would be necessary to achieve a good decontamination and a flow rate comparable to Reynolds number of approximately 80,000 is required. Higher flow velocity will result in better decontamination but pumping and piping costs would be higher. However, tests indicate that there is no dependency on flow for the primary solution indicating that the removal here is entirely chemical in nature as compared to the ammonium citrate rinse where the activity is removed by chemical reaction as well as chelation. However, since the piping would be designed for a flow rate to meet the minimum requirements of the secondary solution, the minimum flow rate would be applied to both solutions. Regarding the residence time requirements for the decontamination solutions, this period is defined as the time during which a particular solution is in contact with the contaminated surface at the desired flow and temperature. It does not include the time during which the solution is circulated and brought to temperature or later when cooled down. The selection of a residence requires a compromise between corrosion rate and ability to decontaminate. When the activity has reached a constant value it can be assumed that further exposure will remove little if any additional activity. This is a critical factor for the secondary solution rinses where corrosion rates are higher than for the caustic permanganate and this residence time for the secondary or rinse solution is found to be 30 minutes. In case of the primary solution, it was found that residence times was found satisfactory in the range between 30 and 60 minutes.

Table I below shows an example of the steps of a specific process in accordance with the principles of this invention found to produce a very effective decontamination of the materials described above.

*Table I*

| Step | Solution and Concentration (by weight) | Residence Time (minutes) | Flow Rate (ft./sec.) | Temperature (° F.) |
|---|---|---|---|---|
| 1 | 10% Sodium Hydroxide<br>5% Potassium Permanganate | 30 | 5 | 225 |
| 2 | Demineralized Water | 5-10 | 5 | Room Temperature |
| 3 | 60 Minute "Aeration" (drying) | | | |
| 4 | 5% Ammonium Citrate<br>2% Citric Acid<br>1/2% Versene | 30 | 5 | 220 |
| 5 | Demineralized Water | 5-10 | 5 | Room Temperature. |

Using the process shown in Table I, in test runs made on 12 pieces of stainless steel material, it was found that with the exception of one sample, the decontamination factors (DF) resulting from the decontamination treatment were all greater than 70 and one sample had zero activity at the completion of the treatment. The initial and final activity as well as the DF obtained are tabulated in Table II below:

*Table II*

| Net Initial Activity Counts Per Minute (Gamma) | Net Final Activity Counts Per Minute (Gamma) | Decontamination Factor |
|---|---|---|
| 2,195 | 0 | |
| 8,208 | 11 | 746 |
| 3,174 | 17 | 187 |
| 6,894 | 18 | 383 |
| 5,591 | 29 | 193 |
| 22,770 | 40 | 569 |
| 17,160 | 41 | 419 |
| 15,180 | 78 | 195 |
| 12,960 | 124 | 105 |
| 10,900 | 147 | 74 |
| 27,090 | 279 | 97 |
| 13,760 | 372 | 37 |

The differences in the initial activity of samples listed in Table II are due to differences in size and location. The surface of the section exposed to primary coolant on the inlet side of the steam generator was higher in activity than that exposed to primary coolant on the outlet side.

A possible mechanism may be presented to account for the success of this process. The mechanism would involve four steps:

A. Oxidation
    B. Formation of manganese dioxide
    C. "Aeration" or air oxidation
    D. Removal of activity The first step (A) in the decontamination treatment is the formation and reaction of the oxidizing solution. When a mixture of the caustic permanganate is heated near the boiling point, oxygen is liberated according to the reaction:

$$4KMnO_4 + 4NaOH \rightleftharpoons 4NaKMnO_4 + 2H_2O + O_2 \quad (1)$$

The combination of the permanganate and oxygen provides a strong oxidizing medium to convert the corrosion product scale to a form that can be readily removed by the secondary solution rinse.

The second step (B) in the decontamination mechanism is the formation of a brown film which is assumed to be manganese dioxide. This is an excellent scavenger for radioactive nuclides whether they are present in solution or associated with particulate matter. The $MnO_2$ is formed as the result of a disproportionation reaction of the green manganate solution in an excess of water or in the presence of acid:

$$3NaKMnO_4 + 2H_2O \rightarrow 2KMnO_4 + 3NaOH + KOH + MnO_2 \quad (2)$$

The reaction does not take place in an excess of alkali; however, it will take place if the alkali is removed by the addition of acid, even a weak acid such as carbonic acid.

The third step (C) involves an "aeration" time of the contaminated specimen following the first water rinse. The reason for increased decontamination as a result of the aeration period is not fully understood but is an important feature of this process.

The final step (D) in the decontamination is the removal of the activated corrosion product scale. It has been found that the major part of the activity (approximately 80 percent) is removed by the secondary solution rinse. The rinse must accomplish the dissolution of the manganese dioxide as well as the removal of the corrosion product scale. The former is accomplished by chemical reaction with the citrate-citric acid-Versene by reducing the manganese to the manganous ion form. The citrate and/or citric acid is probably converted to a degradation product such as itaconic or aconitic acid with a minimum of gas evolution. The scale removal is accomplished by a loosening and solubilizing action of the citrate and/or citric acid-Versene solution. All rinse solutions removed during the secondary solution phase of the decontamination were found to be clear. Citrate is an excellent complexing agent for ferric ion, forming mole to mole complexes in the pH range from 1.5 to 7. Versene is also an excellent complexing agent for ferric ion, particularly in the acidic range and for other polyvalent ions in both the acid and basic ranges.

It is thus seen that there is provided a highly efficient and superior chemical process utilizing the fill-flush technique for the decontamination of stainless steel and similar materials utilized in the primary system of pressurized water type reactors and similar type nuclear facilities. The techniques herein described is suitable for use in an operating nuclear facility of this type and can be conveniently incorporated into the arrangement so that when a particular primary unit is to be worked upon, it may be cut off from primary flow and flushed in the manner herein provided to bring the contamination level down to a point where it may be worked upon conveniently.

While, of course, only one embodiment of this invention has been described, it is understood that modifications utilizing the basic solution materials and the amounts and times indicated may be resorted to without departing from the principles of the invention and that the invention is intended to be covered by the scope of the appended claims.

We claim:

1. A method of decontaminating a steel surface coated with a radioactive scale comprising the steps of flushing said surface continuously with a caustic permanganate solution until the decontamination level of said surface stabilizes, and then drying said surface, flushing said surface with a citric acid solution, and then washing said surface to remove substantially all traces of said solutions.

2. The method of claim 1 in which said caustic permanganate solution contains sodium hydroxide and potassium permanganate.

3. The process of claim 1 in which said citric acid solution contains substantial amounts of ammonium citrate and traces of a sodium salt of ethylene-diamine-tetra-acetic acid.

4. A method of removing from a nuclear device corrosion products comprising the steps of flushing said device with a caustic permanganate solution providing a strong oxidizing medium, rinsing said device clear of said solution, aerating said device until the flushed surfaces thereof are dry, and flushing said device with a citrate solution consisting of a solution in water of ammonium citrate, citric acid, and a small amount of a sodium salt of ethylene-diamine-tetra-acetic acid to loosen and dissolve the remaining scale.

5. The method of claim 4 in which the caustic permanganate solution consists of a solution in water of sodium hydroxide and potassium permanganate.

6. A method of the chemical decontamination of radioactive surfaces comprising the steps of flushing said surfaces with a primary solution in water of sodium hydroxide and potassium permanganate, washing said surfaces clean with demineralized water, drying said surfaces by aeration, flushing said surfaces by a secondary solution in water of ammonium citrate, citric acid, and a sodium salt of ethylene-diamine-tetra-acetic acid, and washing said surfaces clean with dimineralized water.

7. The method of claim 6 in which the primary solution contains said hydroxide and permanganate in the amounts of 10% and 5%, respectively, by weight and the rinsing solution contains said citrate, acid, and a sodium salt of ethylene-diamine-tetra-acetic acid in the amounts of 5%, 2% and ½%, respectively, by weight.

8. The method of claim 6 in which said secondary solution flows at a rate comparable to a Reynolds number of approximately 80,000.

9. The method of claim 6 in which the temperature of said primary solution is within the range of 185° F. and 225° F. and the solution is maintained under pressure sufficient to prevent boiling of said solution.

10. The method of claim 6 in which the residence time of said secondary solution does not exceed thirty minutes.

References Cited in the file of this patent

UNITED STATES PATENTS

| | | |
|---|---|---|
| 1,899,734 | Stockton | Feb. 28, 1933 |
| 2,428,364 | Frager | Oct. 7, 1947 |